July 2, 1940. J. A. VAN DEN AKKER ET AL 2,206,521
ILLUMINATING APPARATUS
Filed Jan. 18, 1937 2 Sheets-Sheet 1
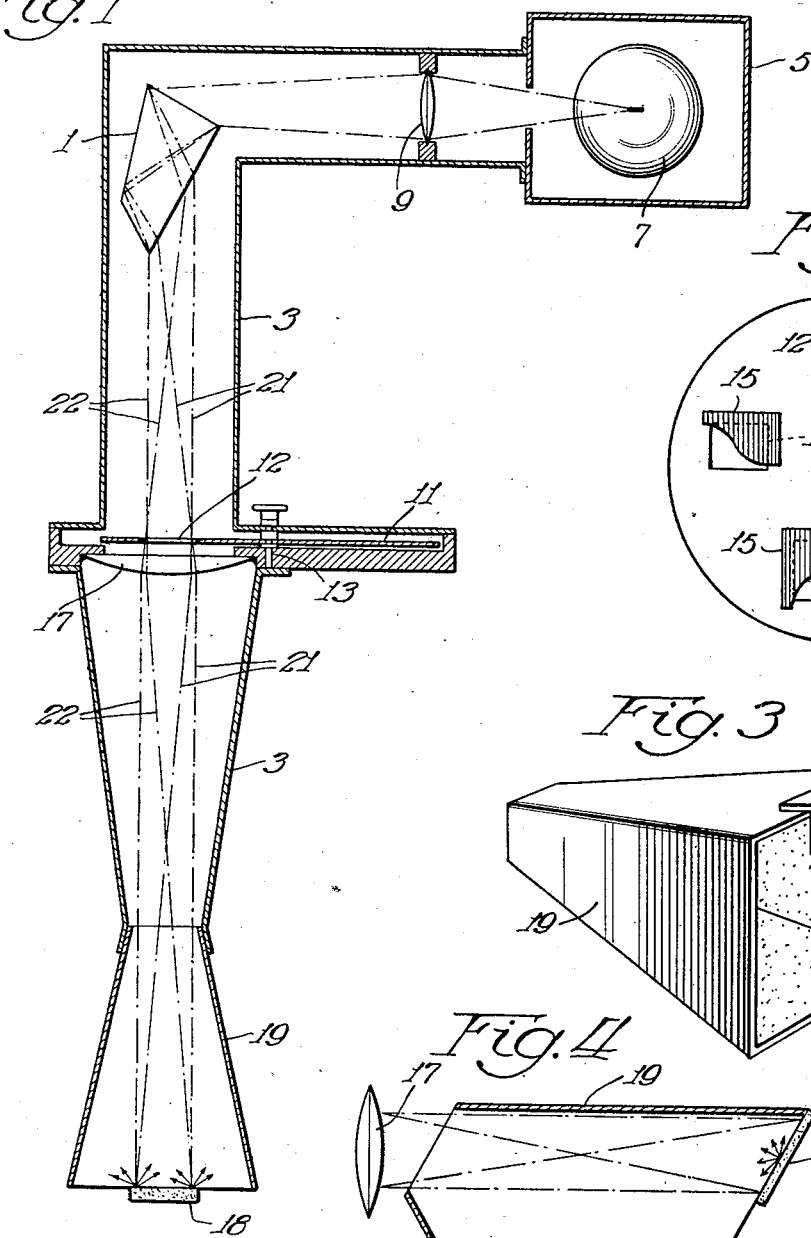
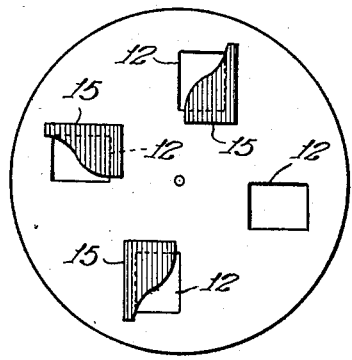
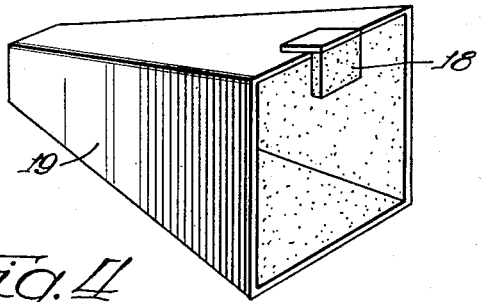
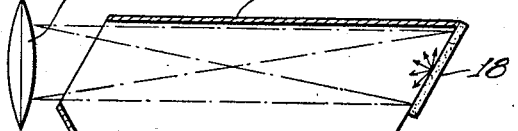
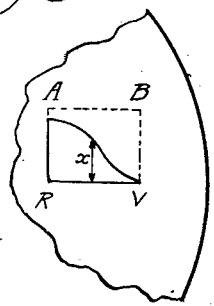
Inventors:
Johannes A. Van den Akker
Philip Nolan.
By: Fisher, Clapp, Soans & Pond

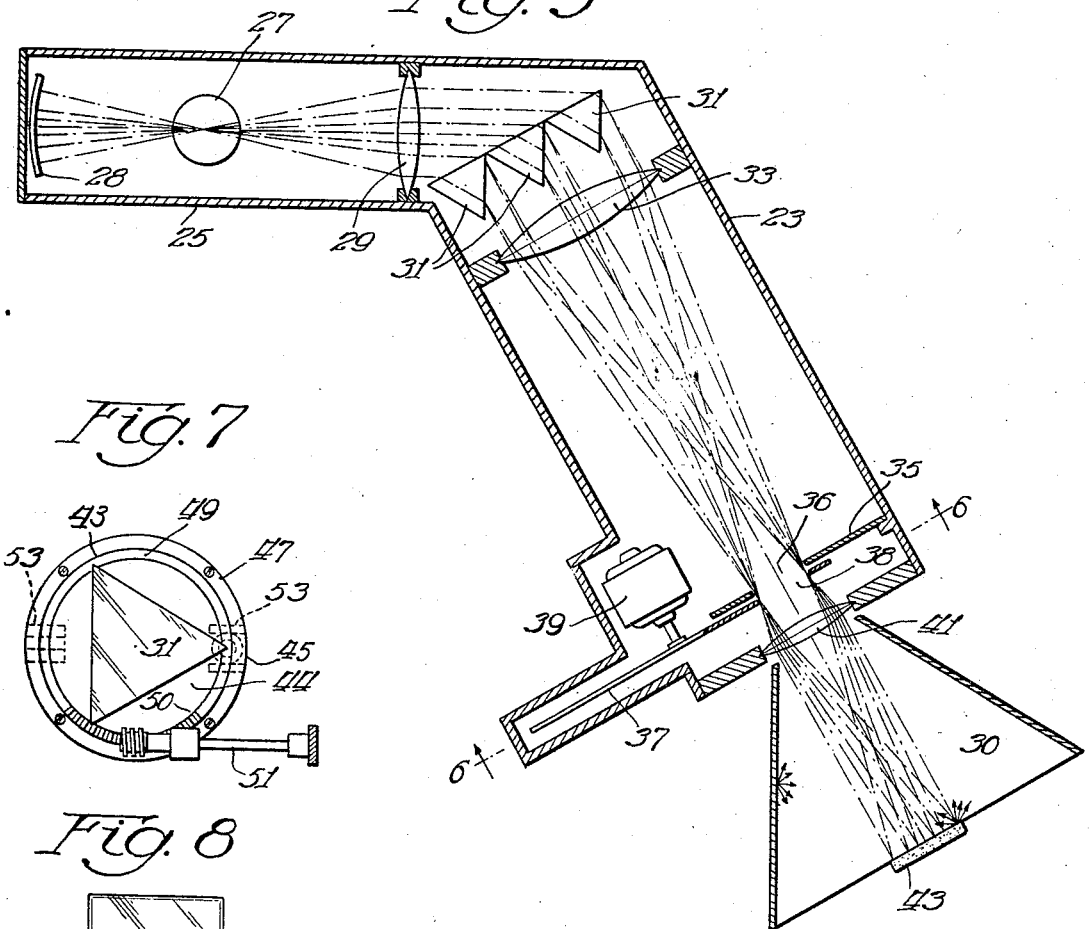
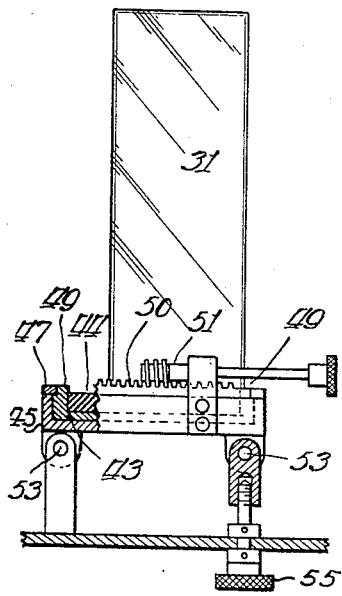
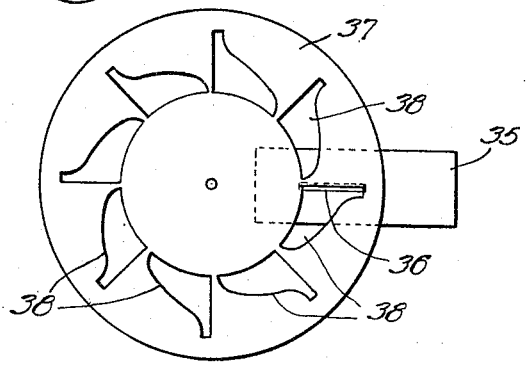

Patented July 2, 1940

2,206,521

UNITED STATES PATENT OFFICE 2,206,521

ILLUMINATING APPARATUS

Johannes A. Van den Akker and Philip Nolan, Appleton, Wis., assignors to The Institute of Paper Chemistry, Appleton, Wis., a corporation of Wisconsin Application January 18, 1937, Serial No. 121,052

3 Claims. (Cl. 240—1)

Our invention relates generally to the science of optics and is concerned particularly with illuminating apparatus capable of producing light of any predetermined spectral energy distribution.

It is well known that the spectral energy distribution of daylight is a variable quantity dependent upon the time of day, the time of year, the condition of the atmosphere, whether or not the light is direct or reflected, and upon other considerations. The spectral energy distribution of artificial light is likewise not a fixed quantity and generally differs materially from the energy distribution of daylight. Thus, in the matching of color and in the comparative examination of colored articles, it is very desirable to have available a source of light of definite and controllable energy distribution in order that standardization of color and duplication of color effects may be accomplished. The principal object of the present invention is to provide an improved device for producing light of any predetermined spectral energy distribution.

We are aware that devices have been developed which are supposed to produce light of predetermined spectral energy distribution. One general type of these devices utilizes artificial light sources in conjunction with filters; these arrangements are, however, most unsatisfactory. There is only a definite number of dyes or substances suitable for use in filters, and the manner in which these dyes or substances selectively absorb light is fixed by the nature of those dyes or substances, hence, in general, only a rough approximation can be attained in designing a filter for the purpose of producing light of any predetermined spectral energy distribution.

The only other type of prior art device which has received serious consideration utilizes a source of artificial light and an optical system embodying a prism and an apertured screen so arranged that only certain portions of the spectrum of the light source pass through the device. The devices of this last mentioned type now known to the art, while generally capable of producing light of the desired spectral energy distribution, produce this light at such low levels of illumination as to require the use of photocells or other complicated auxiliary apparatus in conjunction therewith.

Our invention is particularly concerned with the improvement of devices of this latter type, and a further object of our invention is to provide a device of this type which is not only capable of producing illumination of predetermined spectral energy distribution, but which is capable of producing this type of illumination at sufficiently high intensities to permit the use of the device for direct observation and in conjunction with microscopes and similar apparatus requiring high levels of illumination.

Other objects of our invention are to provide an illuminating device which shall be capable of producing light of any predetermined spectral energy distribution and which shall include means for assuring even distribution of the light produced by the device; to provide an improved combining reflector for use in conjunction with illuminating devices capable of producing light of any predetermined spectral energy distribution; to provide an illuminating device of the above described type which is inherently capable of producing illumination at high energy levels through the use of relatively inexpensive and readily available optical equipment; and generally, to provide an improved device for producing light of predetermined spectral energy distribution.

Two preferred embodiments of our invention are illustrated in the accompanying drawings wherein—

Figure 1 is a diagrammatic view illustrating the features of an illuminating device constructed in accordance with the present invention;

Figure 2 is an elevational view of the screen used in conjunction with the device illustrated generally in Figure 1;

Figure 3 is a perspective view of the combining reflector forming a part of the device illustrated in Figure 1;

Figure 4 is a sectional view of the combining reflector illustrated in perspective in Figure 3;

Figure 5 is a diagrammatic view of a modified form of the device illustrated in Figure 1;

Figure 6 is an elevational view of the screen used in conjunction with the device illustrated in Figure 5;

Figure 7 is a plan view of one of the prisms and the adjustable mounting therefor utilized in the device illustrated in Figure 5;

Figure 8 is an elevational view similar to Figure 7; and

Figure 9 is an enlarged view illustrating certain of the steps in the calculation of the dimensions of the aperture openings used in conjunction with the apparatus of our invention.

Referring to the drawings, it will be seen that the device illustrated in Figure 1 comprises, generally, a source of light, collimating means, a prism or the like for dispersing the light so as to form a spectrum, a masked aperture for blocking out predetermined portions of the spectrum in order to obtain the desired energy distribution in the light energy which passes through the device, and a combining reflector for mixing the light passed by the aperture.

More specifically, this device includes a single prism 1, preferably of sufficiently large size to permit the attainment of the desired level of illumination when the device is in use. The prism 1 is positioned within a generally L-shaped closure 3, the defining walls of which are light-impervious. A lamp housing 5 which is adapted to enclose an incandescent filament lamp 7 is mounted at one end of the closure 3 so as to cooperate with a condensing lens 9 positioned adjacent thereto. The lamp 7 is preferably provided with a filament capable of producing a line source of illumination, and the optical constants of the system are so arranged that the light from this line source is collimated by the lens 9 into a beam which is directed upon the front face of the prism 1 and thereby dispersed into a generally rectangularly shaped spectrum. In the plane formed by the continuum of monochromatic images of the line source which make up this spectrum a circular, opaque screen 11 having the form illustrated in Figure 2 is placed. This screen 11 is provided with four rectangular aperture openings 12 each of sufficient size to include the entire visible portion of the spectral image, and the screen 11 is rotatably mounted upon a suitable pivot 13 so that any one of the openings 12 may be moved into coincidence with the visible portion of the spectral image.

Each of the openings 12 may be partially masked by a paper or metallic mask, such as is illustrated at 15, in order that the energy distribution of the light which passes through the device may be readily adjusted to any one of a plurality of different values merely by rotation of the screen 11. For most ordinary types of work, masks designed to yield light having equal spectral energy distribution, the spectral energy distribution of north sky light, and the spectral energy distribution of mean noon sun light, will be found particularly useful.

While there are several ways to mask the aperture openings in the screen, the most convenient method consists in the provision of a suitably shaped mask for varying the shape of the top edge of the opening with respect to the bottom edge. Since the spectral energy distribution of the light source can be readily ascertained, and since the dispersion of the prism and the other optical constants of the system are capable of accurate determination, it is possible to readily calculate the shape of the mask, or what is the same thing, the shape of the opening which will cause the total light which passes through the device to have any desired spectral distribution. A more complete exposition of these calculations will be given in a subsequent paragraph. The ultization of a rotatable screen having four aperture openings is solely a matter of convenience and, if desired, other forms of screens may be employed.

After passing through the aperture opening, the light falls upon a lens 17 which images the front face of the prism 1 (i. e. the face upon which the collimated light beam from the light source impinges) upon a reflector plate or target 18, preferably formed from a flat surfaced block of magnesium carbonate, or similar material possessing good reflective and diffusive characteristics. This plate or target 18 is conveniently positioned adjacent one of the sides of a combining reflector 19 which, in the device illustrated in Figure 1, has the form of a truncated prism. The inner surface of the reflector 19 is coated, as by flashing, with magnesium oxide or some other highly reflective substance possessing high diffusive characteristics. A flat metal plate similarly coated with magnesium oxide may be used as the target 18.

The combination of an optical system of this particular type and a combining reflector such as has just been described makes possible extremely efficient mixing and recombining of the light which is passed through the aperture of the screen 11. To begin with, the lens 17 in focusing the image of the front face of the dispersing prism 1 upon the surface of the reffector target 18 thereby accomplishes substantially complete mixing of the light energy passing through the device, and since the only light which falls upon the object being illuminated by the device must be reflected from the reflector target 18 and the walls of the reflector closure, further mixing of the light is accomplished by the diffusing action of the surface of the reflector block 18 and the coating of the walls of the reflector proper. The lines 21 and 22 in Figure 1 indicate, respectively, the optical paths for the extreme red and the extreme violet.

In one practical embodiment of the invention, the light source 7 constitutes a 500 watt projection lamp, the filament of which comprises a series of coplanar segments of helically wound, tungsten filament wire. Viewed from the side at the proper angle, the filament of this lamp presents a reasonably good line source. The collimating lens 9 constitutes an accurately ground convex lens of 100 millimeter focal length arranged to gather light from the light source and to form an image of the latter at a distance of roughly 300 millimeters. The prism is spaced about 120 mm. from the lens 9, and the lens 9 is spaced an equal distance from the filament of the lamp 7. The prism is of the constant deviation type and disperses the collimated beam formed by the lens 9 into a generally rectangularly shaped spectral image located in a plane about 230 mm. from the optical center of the prism. The mixing lens 17 in this embodiment of the invention constitutes an accurately ground plano-convex lens of 140 mm. focal length, and it serves to focus the image of the front face of the prism upon the target 18 of the combining reflector at a distance of about 580 mm. from the optical center of the prism.

The combining reflector in this device constitutes a truncated prism 100 mm. square at the larger end and 35 mm. square at the smaller end, the sides of the prism having a length of about 145 mm.

The spot of light imaged upon the reflector target 18 in actual practice is not of exactly uniform color, but is slightly fringed with violet on one side and red on the other. This slight inaccuracy in the mixing of the light energy passed by the apertured screen 11 is compensated for by the diffusing action of the combining reflector. Tests indicate that it is quite practical to make a device of this type capable of producing illumination of a level suitable for direct visual examination, for comparison of various samples, and for microscopic examination and photography.

The higher levels of illumination are realized when large size, accurately ground lenses are utilized in conjunction with large size, accurately ground prisms. This characteristic of the device which requires the utilization of large, accurately ground lenses and prisms in certain instances makes for relatively expensive apparatus and restricts, to some extent, the usability of existing commercial prisms and lenses. We have found, however, that it is possible to attain high levels of illumination through the utilization of a plurality of small prisms, thereby greatly reducing the cost of the device and also extending its possible useful age. A structure of this multi-prism type is illustrated diagrammatically in Figure 5.

The device illustrated schematically in Figure 5 is similar to the structure just described in that it utilizes a light tight closure 23 for the optical system thereof, a lamp housing 25, an incandescent filament light source 27 positioned within the housing 25, a reflector 28 and a lens 29 for collimating the light from this source into a beam, and a combining reflector 30 for intermixing the light passing through the device. Instead of a single prism, however, this modified embodiment of our invention is provided with three small prisms 31, and at least two of these prisms 31 are mounted so as to be both tiltably and rotatably adjustable.

A lens 33 arranged adjacent the prism 31 serves to focus and to aid in combining the monochromatic spectral images making up the spectrum formed by each of the prisms 31 into a single continuum of monochromatic images located substantially in the plane of an opaque screen 35 supported by the walls of the closure 23. The screen 35 is provided with a narrow slot 36 through which all of the light emitted by the device must pass. This slot is so proportioned that it includes substantially the complete visible portion of the spectrum formed by the prisms 31 and the lens 33.

The distribution of the light energy which passes through the slot 36 is determined by means of a circular mask 37 (shown particularly in Figure 6) which is provided with a plurality of aperture openings 38 symmetrically arranged about the center thereof. During use of the device, this mask 37 is rotated at high speed by a motor 39 and is so located that each of the aperture openings 38 is moved successively across the slot 36 in the screen 35. The use of a rotating mask is made necessary because of the fact that the light source 27 is of the point source type and produces a very narrow spectrum. It is only when a line type light source is employed that the spectrum is of sufficient size to permit the use of a stationary mask and aperture.

The mask 37 preferably comprises a circular metal plate having the aperture openings 38 cut therein, as by a die or other suitable means. It will be apparent that the cutting of the aperture openings 38 in a mask of this type will present somewhat more of a problem than the cutting of the openings in a stationary mask. Also, since a separate mask is required for each desired type of illumination, the rotary mask type devices are less adaptable and less convenient to use than the stationary mask type device. For these reasons, the use of the line source and a stationary mask is generally to be preferred; however, under certain circumstances, it is possible to attain somewhat higher levels of illumination through the use of a point source.

The light energy which passes through the slot 36 in the screen 35 and the apertures 38 in the rotating mask 37 impinges upon a lens 41 so arranged that it serves to image the front face of the prisms 31 upon the inner surface of a generally flat plate target 43 forming a part of the combining reflector 30. This plate target 43 is exactly similar to the target 18 utilized in conjunction with the previously described device and preferably comprises a flat plate of magnesium carbonate having a relatively smooth surface. Magnesium carbonate is selected for this use for the reason that it possesses a very high reflectivity combined with high diffusive characteristics. The combining reflector 30 includes a suitable reflector closure which may have the general form of a truncated cone or a truncated pyramid similar to the reflector closure of the previously described device, and the inner walls of this closure are preferably coated with a substance such as magnesium oxide which is highly reflective, but which at the same time accomplishes good diffusion of the light reflected therefrom.

Each of at least two of the small prisms 31 is, as mentioned previously, adjustably mounted in order that exact coincidence of the three spectral images formed by the prisms 31 may be readily attained during use of the device. The mounting, illustrated particularly in Figures 7 and 8, includes a suitably cup-shaped base 43 within which the prism is permanently supported, as by soft solder, sealing wax, or like material indicated at 44. This cup-shaped base 43 is journaled within a cup-shaped main support 45 so as to permit rotation of the prism about its longitudinal axis relative to the main support 45. A retainer ring 47 holds the two members 43 and 45 in operative engagement. To permit convenient rotative adjustment of the prism, the support 43 is provided with an upwardly extending flange 49 which is threaded as at 50 so as to cooperatively engage a worm screw 51 supported upon the main support 45. The main support member 45 is tiltably mounted upon the supporting structure for the device itself by means of a pair of pivot supports 53, and a thumb screw 55 is provided for accomplishing the tilting adjustment.

The adjustable mounting for the prisms 31 assures the most effective utilization of all three of the prisms and adds considerably to the accuracy and satisfactory operation of the device as a whole. In this connection, it is important to note that three properly correlated small prisms are capable of passing as much light as a single large prism of approximately nine times the volume of the small prisms. This means that there is less absorption of the light when small prisms are used. Further, since small prisms can generally be ground more accurately than large prisms, better and more accurate dispersion is attainable by the use of a plurality of small prisms instead of one large prism. The multi-prism type of device is much less expensive to manufacture due to the fact that three small prisms capable of accomplishing the work of one large prism are relatively much less expensive than the single large prism. This means that illuminating devices of the character described capable of producing high levels of illumination can be conveniently manufactured at low cost from readily available optical equipment.

In calculating the dimensions of the masks for the apertures, the following theory is considered:

First, the relationship between the distance along the bottom edge of the aperture and the wave length of the light is determined; this is most easily accomplished by actual experiment. The incandescent filament lamp may be replaced by a slit illuminated by a source of known line spectrum. Lines of known wave-length may then be observed on a white screen placed over the aperture opening, and from measurements of the positions of these lines, a curve relating wave-length and distance from either vertical edge of the aperture may be obtained. Assuming that the required spectral energy distribution function is $E_R(\lambda)$, this function is defined in such a way that the energy contained between the wave-lengths $\lambda$ and $\lambda+d\lambda$ is proportional to $E_R(\lambda)d\lambda$. The spectral energy distribution functions of incandescent filament lamps are known; for the lamp that is used, we may consider this function to be $E_w(\lambda)$. If we imagine the aperture to be covered by a mask which permits a vertical opening distance "$x$" (Figure 9) over the point corresponding to the wave length $\lambda$, then the energy of light confined within the wave-length limits $\lambda$ and $\lambda+d\lambda$ arriving at the reflector target is given by the expression:

$$E_R(\lambda)d\lambda = K'xE_w(\lambda)T(\lambda)d\lambda$$

where $K'$ is a constant and $T(\lambda)$ is the transmission of the lenses and prism at the wave-length $\lambda$. After reflection from the surface of the target, the energy confined in the infinitesimal wave-length range will be reduced slightly to a value equal to the right hand side of the above equation, multiplied by the factor $R(\lambda)$, where $R(\lambda)$ is the spectral reflectivity of the target. From this it follows that the height of the aperture opening, $x$, which will permit the passage of the required spectral energy distribution $E_R(\lambda)$ of the light after reflection from the target of the combining reflector, may be ascertained from the following equation:

$$x = \frac{E_R(\lambda)}{K'E_w(\lambda)T(\lambda)R(\lambda)}$$

To cut the mask, it is necessary to first locate the points along the bottom edge of the aperture corresponding, say, to the wave-lengths of 400, 450, ... 650 and 700 millimicrons by means of the dispersion curve described above. At these points the computed values of $x$ for the respective wave-lengths are plotted. A smooth curve is drawn and the area bounded by this curve and the bottom and two vertical edges of the aperture is cut out. The spectral energy distribution of light passing through a mask cut in this manner will be substantially exact, the only possible inaccuracies resulting from the fact that the source is slightly extended and the unavoidable aberrations in the optical system. If care is exercised in the plotting of the curve and the cutting of the mask, these errors will be negligible. In determining the dimensions for the apertures in a rotating mask, it is necessary, of course, to use circular functions, otherwise the calculations are exactly the same.

From the foregoing it will be seen that we have disclosed the features of a novel type illuminating apparatus which is capable of producing illumination of any predetermined spectral energy distribution at high levels of illumination. The excellent operational characteristics of the apparatus of our invention are, to a large extent, due to the utilization of a combining reflector of the particular type disclosed in conjunction with the particular optical system disclosed. We have also disclosed how a plurality of prisms may be utilized in accomplishing very high levels of illumination in devices of the character described. This multi-prism form, as has been previously discussed, not only reduces the cost of the apparatus as a whole, but permits more accurate control of the energy distribution of the light passed therethrough.

The principles disclosed in the foregoing may be embodied into various types of apparatus. It is our intention, therefore, that the accompanying claims shall be accorded the broadest reasonable construction consistent with the state of the art.

We claim the following as our invention:

1. In illuminating apparatus of the class described, a prism, means for directing a high intensity beam of collimated light upon one of the faces of said prism, said prism serving to disperse said beam into a spectrum, an apertured screen arranged to mask predetermined portions of said spectrum, an open ended combining reflector, a reflecting target positioned adjacent the open end of said combining reflector, and a lens system for focusing the image of the front face of the dispersing prism upon said reflecting target, said reflecting target and the walls of said reflecting closure having high reflective and high diffusive properties.

2. In illuminating apparatus of the class described, a line source of light, a prism, a lens for directing a collimated beam of light from said line source upon the front face of said prism, a lens system arranged to cooperate with said prism so as to form a generally rectangularly shaped spectrum consisting of a plurality of aligned monochromatic images all located in a single surface, an apertured screen arranged coincident with said spectrum and adapted to permit the passage of only certain portions of the light energy thereof through said apparatus, a combining reflector comprising an open ended flared closure and a cooperating reflector target positioned adjacent the open end of said flared closure, and a lens system for focusing the image of the front face of the dispersing prism upon the surface of said reflector target, the reflecting surfaces of said reflector target and of said flared closure having high reflective and high diffusive properties.

3. In illuminating apparatus of the class described, a plurality of prisms arranged side by side, means for directing a high intensity beam of collimated light upon the front faces of said prisms, each of said prisms serving to disperse the light directed thereon into a spectrum, adjustable mountings for at least all but one of said prisms whereby exact coincidence of the spectrum formed by said prisms can be accomplished, an apertured screen arranged to mask predetermined portions of said coincident spectrum whereby only a predetermined portion of the light energy thereof will pass through said device, a combining reflector including an open ended flared closure and a cooperating reflecting target positioned adjacent the open end of said flared closure, and a lens system for focusing the images of the front faces of said dispersing prisms upon said reflecting target, said reflecting target and the walls of said reflecting closure having high reflective and high diffusing properties.

JOHANNES A. VAN DEN AKKER.
PHILIP NOLAN.